United States Patent
Hong et al.

(10) Patent No.: US 8,457,381 B2
(45) Date of Patent: Jun. 4, 2013

(54) COMPLEMENTARY PET RECONSTRUCTION

(75) Inventors: Inki Hong, Knoxville, TN (US); Michael E Casey, Louisville, KY (US); Christian J Michel, Lenoir City, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 172 days.

(21) Appl. No.: 13/223,527

(22) Filed: Sep. 1, 2011

(65) Prior Publication Data

US 2013/0058551 A1    Mar. 7, 2013

(51) Int. Cl.
*G06K 9/00* (2006.01)

(52) U.S. Cl.
USPC .......................................................... 382/131

(58) Field of Classification Search
None
See application file for complete search history.

(56) References Cited

U.S. PATENT DOCUMENTS

| | | | |
|---|---|---|---|
| 2003/0109779 A1* | 6/2003 | Ohishi et al. | 600/407 |
| 2008/0267477 A1 | 10/2008 | Conti et al. | |
| 2009/0072155 A1 | 3/2009 | Watson et al. | |
| 2010/0070808 A1 | 3/2010 | Casey et al. | |
| 2010/0074500 A1 | 3/2010 | Defrise et al. | |
| 2010/0078568 A1 | 4/2010 | Byars et al. | |
| 2011/0042572 A1 | 2/2011 | Bendriem et al. | |
| 2011/0142315 A1* | 6/2011 | Hsieh et al. | 382/131 |
| 2012/0027281 A1* | 2/2012 | Jang et al. | 382/131 |

OTHER PUBLICATIONS

B. Guerin; S. Cho; S.Y. Chun; Z. Zhu; N.M. Alpert; G. El Fakhri; T. Reese; and C. Catana, "Nonrigid PET Motion Compensation in the Lower Abdomen Using Simultaneous Tagged-MRI and PET Imaging", May 31, 2011, Medical Physics, vol. 38, No. 6, Jun. 2011, pp. 3025-3038.*

* cited by examiner

*Primary Examiner* — Bhavesh Mehta
*Assistant Examiner* — Siamak Harandi
(74) *Attorney, Agent, or Firm* — Peter Kendall

(57) ABSTRACT

Using complementary reconstruction, images from short time frames may be generated for positron emission tomography. Detected events are gathered over a long period, such as three minutes. The detected events from a short period, such as one or two seconds, are removed. Reconstruction is performed on the detected events from the long period and another reconstruction is performed on the detected events from the long period without the detected events from the short period. The second reconstruction is subtracted from the first, providing data representing the short period. The data may result in better image quality than merely reconstructing an individual frame for the short period.

20 Claims, 3 Drawing Sheets

COMPLEMENTARY PET RECONSTRUCTION

BACKGROUND

The present embodiments relate to reconstruction of emission tomography, such as positron emission tomography (PET).

The uptake function of blood, such as within the brain, may be difficult to measure. The input function may be measured by arterial blood sampling, but blood sampling is invasive. The input function may be estimated using PET in the image or projection domains. However, the input function is best assessed when the contrast is high compared to adjacent tissue uptake. For fluorodeoxyglucose (FDG), the contrast peaks at around 30-40 seconds following injection.

To measure FDG uptake at the contrast peak, the image-domain input function may be obtained by reconstruction of individual short frames (1 or 2 sec frame durations). The detected events during this short period are used for reconstruction. However, the resulting images are very noisy due to the lack of information in the projection (sinogram), resulting in poor delineation of the blood vessels.

Iterative reconstruction with adding regularization and prior information of the shape of the input function may improve the noise. However, these individual frame-based methods have problems due to a positivity constraint of iterative reconstruction, resulting in Poisson noise. This kind of peak noise prevents distinction between blood vessels and tissues. To solve these noise problems, four dimensional reconstruction has been proposed and works well for tissue since the kinetic constant is long enough compared to the very short sampling. The technique fails for blood input function since the necessary basis function to describe the time correlation (i.e., delta function corresponding to individual frame reconstruction) is too short.

BRIEF SUMMARY

By way of introduction, the preferred embodiments described below include methods, systems, and computer readable media for reconstructing an image in emission tomography. Using complementary reconstruction, images from short time frames may be generated. Detected events are gathered over a long period, such as three minutes. The detected events from the short period, such as one or two seconds, are removed. Reconstruction is performed on the detected events from the long period and another reconstruction is performed on the detected events from the long period without the detected events from the short period. The second reconstruction is subtracted from the first, providing complementary data representing the short period. The data may result in better image quality than merely reconstructing an individual frame for the short period.

In a first aspect, a method is provided for reconstructing an image in emission tomography. First emission information is received over a first period and from within a patient. Second emission information is received over a second period and from within the patient. The second period is a sub-set of the first period and is shorter than the first period. The second emission information is subtracted from the first emission information. A first image is reconstructed from the first emission information. A second image is reconstructed from a result of the subtracting of the second emission information from the first emission information. The second image is subtracted from the first image. A subtraction image resulting from the subtracting of the second image from the first image is displayed.

In a second aspect, a non-transitory computer readable storage medium has stored therein data representing instructions executable by a programmed processor for reconstructing a positron emission tomography image for dynamic study. The storage medium includes instructions for performing a first iterative reconstruction, performing a second iterative reconstruction, and calculating a complementary reconstruction from the first and second iterative reconstructions.

In a third aspect, a non-transitory computer readable storage medium has stored therein data representing instructions executable by a programmed processor for reconstructing an image in emission tomography. The storage medium includes instructions for subtracting first detected events from a sub-period from second detected events of a period, the sub-period being within the period, the subtracting resulting in a set of third detected events comprising the second detected events without the first detected events, and generating first data representing the sub-period from the set of the third detected events, the set of the third detected events representing the period without the sub-period.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Complementary PET reconstruction may be used for fast dynamic study. Complementary iterative PET reconstruction may improve image quality for very short frame dynamic study, such as input function in brain PET imaging. Complementary reconstruction uses two iterative reconstructions. The first iterative reconstruction uses a whole duration of the detectable input function. The second iterative reconstruction uses the same data, but skips the particular time-frame for which input function is to be evaluated. Then, the subtraction of two images resulting from the reconstructions is performed, providing the image representing the particular time-frame input function.

The noise properties of the two reconstructed images are Poisson, but their difference is Gaussian. This resulting noise in the difference image may allow better delineation of blood vessels.

Figure 1:
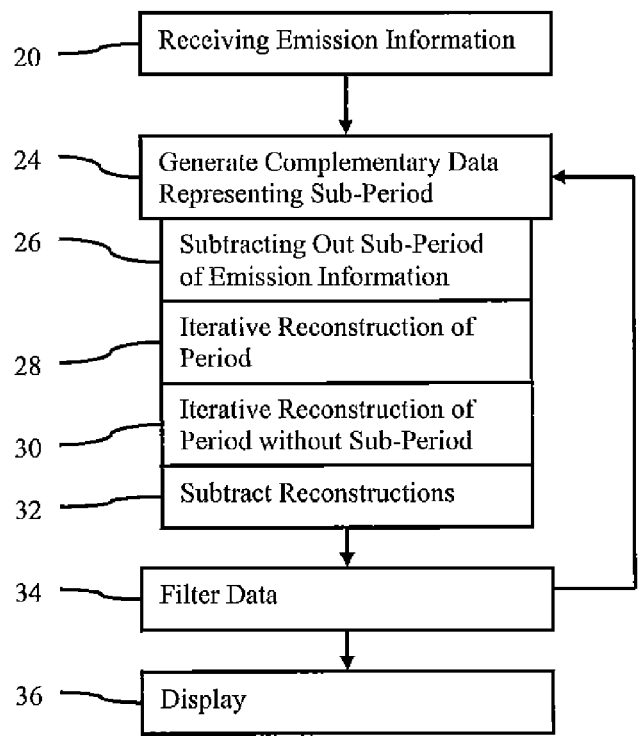
FIG. 1 is a flow chart diagram of one embodiment of a method for reconstructing an image in emission tomography.

FIG. 1 shows one embodiment of a method for reconstructing an image in emission tomography. The method is implemented using the system 10 of FIG. 1, other systems, or computers. The method is performed in the order shown, but other orders may be used. For example, the reconstruction of act 28 is performed prior to the subtracting of act 26. Additional, different, or fewer acts may be provided. For example, the filtering of act 34 is not provided.

In act 20, emission information is received. The emission information is detected events. Detected events are positron emissions, but may be photon emissions (e.g., SPECT information). The detected events occur from within the patient. The emissions from within the patient are detected. Any detection may be used.

Figure 2:
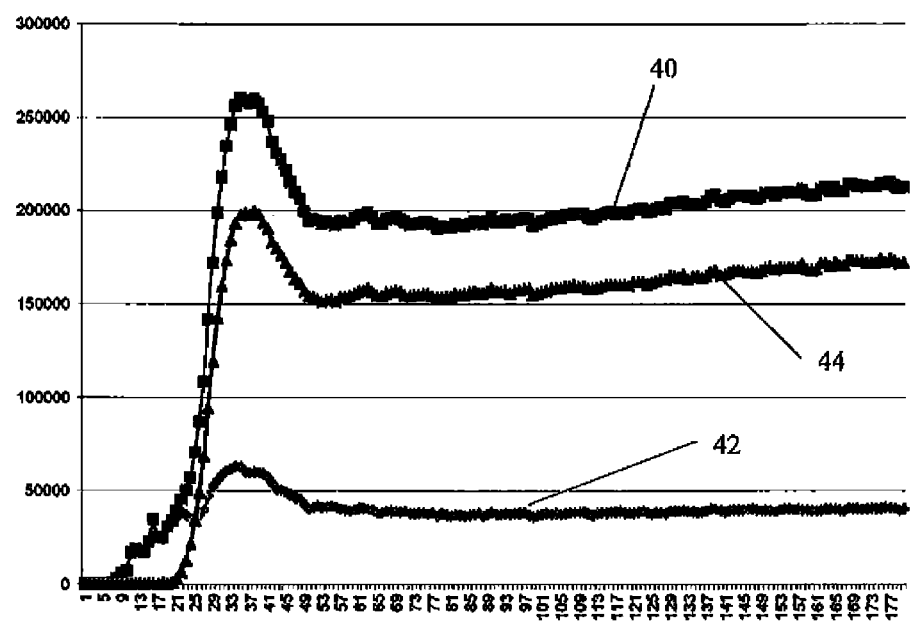
FIG. 2 is an example input function of counts as a function of time.

FIG. 2 shows a graph of detected events. The count rate as a function of frame (sub-period) or time is shown. Both prompt 40 and random 42 measurements are performed. The difference represents the true count 44. Other measurements may be used. The count rate peaks at about frame 39 or 39 seconds after injection in the example of FIG. 2. Other curves may be provided.

The emission information is received over a period. Any period may be used, such as tens or hundreds of seconds. In one embodiment, the events are detected over one hundred or one hundred and eighty seconds. For blood function, the period is at least forty seconds, but may be shorter depending on the start time. The detection period begins upon injection, but may begin prior to or after injection.

The detection period may be divided into sub-periods. The collected set of data is used as a whole, or sub-parts of the set are used.

A given sub-period may be the time for which a short frame representing blood function is desired. For example, a 180 second period includes 180 separate 1 second sub-periods. Emission information is received over the 180 seconds. For a given second, some of the emission information of the 180 second period is received. Other emission information of the 180 second period is received at other times.

One or more sub-periods may be used, such as a single sub-period of less than three seconds. Longer sub-periods may be used.

In one embodiment, at least one sub-period is within about ten seconds of a peak count rate. "About" accounts for inaccuracies in estimation. Peak count for blood uptake may be around 39-40 seconds after injection, depending on the locations of the injection and the examination. The sub-period is selected to be close to the expected time of peak uptake. Alternatively, multiple sub-periods are used to sample over a range of times possibly associated with the peak count or not associated with the peak.

In act 24, the received emission information is used to generate data representing a sub-period. The data represents the detected events for a short frame, such as representing events detected over a period less than three seconds or less than half of the period for which emission information is received.

A complementary reconstruction is calculated from two or more iterative reconstructions. Instead of reconstructing an individual frame, a complementary frame is reconstructed. The complementary reconstruction represents the sub-period. For example, an iterative reconstruction is performed for emissions detected over at least 50 seconds. Another iterative reconstruction is performed for emissions detected over at least 40 seconds. This second reconstruction has the emissions for the desired sub-period removed, such as removing emissions for 10 seconds or less. The complementary reconstruction represents the emissions of the difference between the at least 50 seconds and the at least 40 seconds.

Individual and complementary reconstructed images will be identical if the reconstruction process R(.) is a linear system when Filtered Back-Projection (FBP) is used. However, R(.) is nonlinear for iterative reconstruction, so the individual and complementary reconstructed images will be different. Represented mathematically, the data for complementary reconstruction C is represented as:

$$I_n = R(F_n) \qquad \text{Eq. 1}$$

$$S = \sum_{m=1}^{N} F_m$$

$$C_n = R(S) - R(S - F_n)$$

R(.): reconstruction, N number of frames, $F_n$: n-th frame $I_n$: n-th reconstructed frame, $C_n$: n-th complementary reconstructed frame F is the emission information or detected events for a single sub-period. S is the collection of such events over a reception period, such as 180 frames F of 1 second each. R is the iterative reconstruction The generation of the complementary data includes acts 26-32. In act 26, emission information for the short period for which data is sought is subtracted from the collection of emission information. In equation 1, act 26 is represented as S-$F_n$. As a result of subtracting the detected events of the desired sub-period from detected events of a period, a collection of detected events other than or without the detected events for the desired period is provided. For example, a collection of detected events for 180 seconds is received. To calculate the complementary reconstruction for a one second sub-period at 39 seconds, the detected events for the 39$^{th}$ second are removed from the collection, leaving a collection of detected events from seconds 1-38 and 40-180. Other period lengths may be used, such as the desired sub-period being less than three seconds and the total collection being for more than 100 seconds.

In act 28, the detected events for the longer period are iteratively reconstructed. For example, all of the detected events or the detected events for part of the full period (e.g., iteratively reconstructing from events representing emissions over an at least 50 second window of the 180 second collection) are iteratively reconstructed. This reconstruction includes the detected events for the sub-period for which the complementary reconstruction is desired, such as the detected events near the peak (e.g., 39$^{th}$ second).

The reconstruction is iterative. Any now know or later developed iterative reconstruction may be used, such as performing expectation maximization.

In act 30, the detected events for the shorter period are iteratively reconstructed. The detected events used in act 28, but without the detected events of the desired sub-period (e.g., 39$^{th}$ second), are iteratively reconstructed. The results of the subtraction or removal of act 26 are used for iterative reconstruction. The same data other than the events for which a representation is sought is used. For example, the emission information for at least 50 seconds is used in act 28. After removal of the emission information of ten seconds or less, emission information for at least 40 seconds or more remains.

This 40 second or shorter period is for times other than the time of interest, and the corresponding events are used for reconstruction.

The same type of iterative reconstruction is used for acts 28 and 30, but different reconstruction may be provided. The same parameter values, such as the number of iterations, are used for acts 28 and 30, but different values may be provided.

In act 32, the data from the iterative reconstruction of act 30 is subtracted from the data of the iterative reconstruction of act 28. For example, one maximum intensity projection or two-dimensional image is subtracted from another maximum intensity projection or two-dimensional image. Alternatively, reconstructed data representing a volume is subtracted from reconstructed data representing the volume.

By subtracting the results of iterative reconstructions, the remaining data represents the complement of the desired period (e.g., $39^{th}$ second). The difference represents the short frame or the sub-period subtracted out of the collection in act 26.

The complementary data resulting from the subtraction of the reconstructions indicates a spatial distribution and/or a temporal input function. An image may show the spatial distribution of the detected events over the sub-period, such as a one or two second short frame. A graph may show the input function over the sub-period.

In act 34, the complementary data representing the sub-period may be filtered or otherwise further processed. For example, a Gaussian spatial and/or temporal filter is applied. For spatial filtering, any size kernel may be used, such as 2 or 4 mm. For temporal filtering, a sequence of short frames of complementary data is generated. The temporal filtering is between two or more frames (e.g., 2 second, 4 second or other number of seconds). Other filtering than Gaussian may be used.

In act 36, the complementary image resulting from the subtraction of the reconstructions is displayed. This subtraction image represents a short frame, such as representing detected events from one or two seconds. In one embodiment, the complementary image is an angiography image. The image represents blood uptake over a short period, such as one or two seconds.

Figure 3:
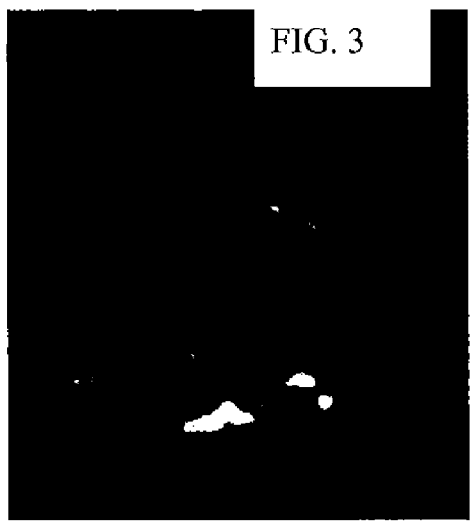
FIG. 3 is an example medical image generated using complementary reconstruction for a one second period.
Figure 4:
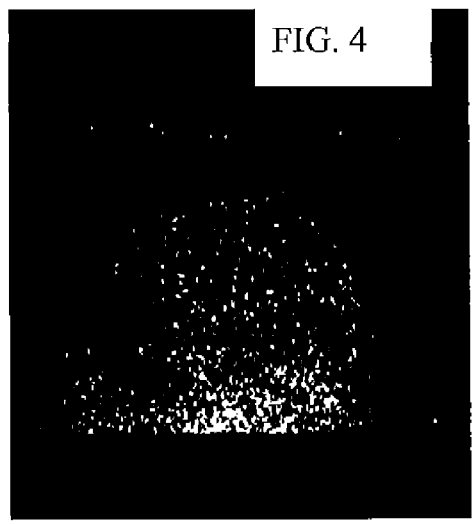
FIG. 4 is an example medical image generated using reconstruction of detected events for the one second period of FIG. 3.

As compared to iteratively reconstructing directly from detected events for the sub-period, complementary reconstruction may provide better image quality and more accurate quantitative values. FIG. 3 shows a complementary reconstruction for the 39-40 second (1 second sub-period) short frame without filtering. FIG. 4 shows a reconstruction directly from the detected events of the 39-40 second period. Both FIGS. 3 and 4 are maximum intensity projection images representing, in two-dimensions, a volume as viewed from the side of a head. The complementary image may have better scatter and random estimation. The complementary image may be used for scatter correction for very short frames and/or low count (noisy) cases, such as being applicable for blood flow images of the brain.

The complementary reconstruction converts a Poisson noise distribution of the two iterative reconstructions of acts 28 and 30 into a substantially Gaussian noise distribution of the complementary reconstruction. The iterative reconstructions by themselves have a Poisson noise distribution, providing for positive and not negative noise. The magnitude of the Poisson noise is greater for shorter or lower count frames because iterative reconstruction has a positivity constraint. Complementary reconstruction changes Poisson to Gaussian shaped noise according to the central limit theorem. As a result, complementary reconstructed images may provide better delineation of a region of interest (ROI). Also, complementary reconstruction may provide better noise estimation, such as scatter and random noise. The signal-to-noise ratio may be almost the same for the complementary reconstruction as reconstruction of the individual frame for the sub-period, but peak noise may be reduced. Reduced peak noise may contribute to a more useful maximum intensity projection image.

FIG. 1 shows a line from act 34 returning to act 24. This represents repetition of the generation of the complementary data. In other embodiments, act 24 is repeated without the filtering of act 34. For temporal filtering, the repetition generates complementary data for other times to be filtered.

The repetition occurs for different sub-periods from the same collection of data. For example, a one second frame of complementary data is generated for each of all or a plurality of times (e.g., sub-periods) within the period of collection. In a 180 second period, 180 different short frames (e.g., one second frames) are generated by repetition. 90 different short frames may be generated as two second frames or as one second frames for a sub-set or window in the 180 second period (e.g., from the $10^{th}$ second to the $100^{th}$ second).

In each repetition, different sub-periods are used. For example, the detected events for the $30^{th}$ second are subtracted out, and the iterative reconstructions for all the seconds and for all but the $30^{th}$ second are performed and subtracted. The other repetitions are for the $29^{th}$, $31^{st}$, and other seconds, resulting in complementary data for each of the seconds or other sub-periods.

Figure 5:
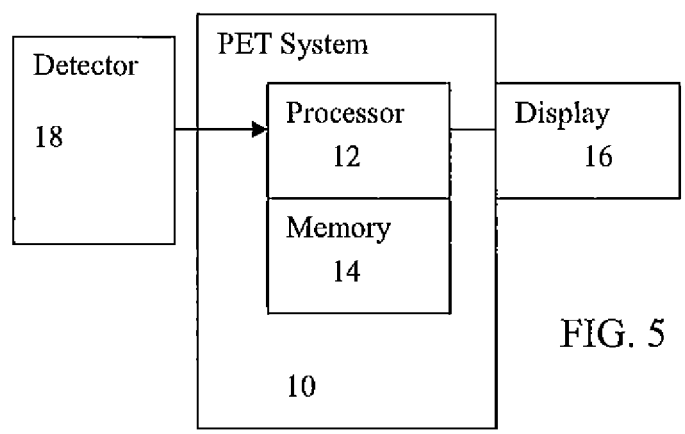
FIG. 5 is a block diagram of a system for complementary reconstruction of emission information according to one embodiment.

FIG. 5 shows a PET system 10 for complementary reconstruction. The system 10 is a PET imaging system, but may be a computer, workstation, database, server, SPECT system, or other system. The system 10 includes a detector array 18, processor 12, a memory 14, and a display 16. Additional, different, or fewer components may be provided. For example, the system 10 is a computer without the detector array 18 for operating on data acquired by another system. As another example, the system 10 includes MRI or CT components. Other parts of the PET system may include power supplies, communications systems, image processing systems, tomography generation systems, and user interface systems. Any now known or later developed PET imaging system may be used.

The PET detector array 18 includes detectors that are crystals or other photon detectors. For example, the detectors 16 are scintillation crystals coupled to avalanche photo diodes. In other embodiments, scintillation crystals are coupled with photomultiplier tubes. The scintillation crystals are bismuth germanium oxide, gadolinium oxyorthosilicate, or lutetium oxyorthosilicate crystals, but other crystals may be used.

The detectors of the array 16 are arranged individually or in groups. The detectors each generate three analog signals, two position signals and one energy signal. Other formats may be provided. To detect positron emission events, the PET detectors are positioned to substantially surround a portion of a patient.

The signals from the detectors are processed to identify specific events. The timing and location information are used to determine the existence of a valid event (i.e., positron emission) and the location of the event (e.g., line along which the event occurred).

The detected events or emission information is stored in the memory 14. The memory 14 is a buffer, cache, RAM, removable media, hard drive, magnetic, optical, database, or other now known or later developed memory. The memory 14 is a single device or group of two or more devices. The memory 14 is shown within the system 10, but may be outside or remote from other components of the system 10, such as a database or PACS memory.

The memory 14 stores a collection of detected events. For example, emission information over a 40 second, 50 second, 180 second or other period is stored. The data is temporally coded so that the relative time of any event may be determined. The data is stored in any format.

The memory 14 may store data at different stages of processing, such as raw data representing detected events without further processing, filtered or thresholded data prior to reconstruction, reconstructed data, filtered reconstruction data, an image to be displayed, an already displayed image, or other data. The memory 14 or a different memory stores data used for processing, such as storing the data after one or more iterations and prior to a final iteration in reconstruction. For processing, the data bypasses the memory 14, is temporarily stored in the memory 14, or is loaded from the memory 14.

The memory 14 is additionally or alternatively a non-transitory computer readable storage medium storing processing instructions. The memory 14 stores data representing instructions executable by the programmed processor 12 for reconstructing a positron emission tomography image for dynamic study and/or reconstructing an image in emission tomography. The instructions are for complementary reconstruction. The instructions for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The processor 12 is a general processor, digital signal processor, graphics processing unit, application specific integrated circuit, field programmable gate array, digital circuit, analog circuit, combinations thereof, or other now known or later developed device for processing emission information. The processor 12 is a single device, a plurality of devices, or a network. For more than one device, parallel or sequential division of processing may be used. Different devices making up the processor 12 may perform different functions, such as one processor for filtering and/or subtracting raw data or reconstructed images and an application specific integrated circuit or field programmable gate array for performing iterative reconstruction. In one embodiment, the processor 12 is a control processor or other processor of a PET imaging system.

The processor 12 operates pursuant to stored instructions to perform various acts described herein, such as subtracting or removing detected events, iterative reconstructing from different collections of data, and calculating a difference or complement between reconstructions. The processor 12 is configured by software and/or hardware to perform any or all of the acts of FIG. 1.

The display 16 is a CRT, LCD, plasma screen, projector, printer, or other output device for showing an image. The display 16 displays an image of input function and/or spatial distribution of uptake. For example, a maximum intensity projection image of detected events is displayed. The image represents the reconstruction of the detected events in a volume from a viewing direction, such as shown in FIG. 3. More than one image may be shown, such as displaying a plurality of thumbnails representing complementary reconstructions for different sub-periods.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for reconstructing an image in emission tomography, the method comprising:
    receiving first emission information over a first period and from within a patient;
    receiving second emission information over a second period and from within the patient, the second period being a sub-set of the first period and being shorter than the first period;
    subtracting the second emission information from the first emission information;
    reconstructing a first image from the first emission information;
    reconstructing a second image from a result of the subtracting of the second emission information from the first emission information;
    subtracting the second image from the first image; and
    displaying a subtraction image resulting from the subtracting of the second image from the first image.

2. The method of claim 1 wherein receiving the first emission information and receiving the second emission information comprises receiving positron emission information.

3. The method of claim 1 wherein receiving the first emission information comprises receiving over the first period comprising at least 40 seconds, and wherein receiving the second emission information comprises receiving over the second period comprises less than 3 seconds.

4. The method of claim 1 wherein receiving the first and second emission information comprises receiving the same information for both the first and second periods during the second period.

5. The method of claim 4 wherein receiving the second emission information comprises setting the second period to be within ten seconds of a peak count during the first period.

6. The method of claim 1 wherein reconstructing the first and second images comprises iteratively reconstructing.

7. The method of claim 6 wherein iteratively reconstructing comprises performing expectation maximization.

8. The method of claim 1 further comprising filtering the subtraction image.

9. The method of claim 1 wherein receiving comprises receiving the first and second emission information from a brain of the patient, and wherein the subtraction image comprises an angiography image.

10. In a non-transitory computer readable storage medium having stored therein data representing instructions executable by a programmed processor for reconstructing a positron emission tomography image for dynamic study, the storage medium comprising instructions for:

performing a first iterative reconstruction;

performing a second iterative reconstruction; and calculating a complementary reconstruction from the first and second iterative reconstructions;

wherein the second iterative reconstruction is performed using the same data as the first iterative reconstruction minus a predetermined time frame for which an input function is to be determined, and wherein calculating provides an image representing the predetermined time frame input via subtraction of two images resulting from the first iterative reconstruction and the second iterative reconstruction.

11. The non-transitory computer readable storage medium of claim 10 wherein calculating comprise subtracting the second iterative reconstruction from the first iterative reconstruction.

12. The non-transitory computer readable storage medium of claim 10 wherein performing the first iterative reconstruction comprises iteratively reconstructing from data representing emissions over at least 50 seconds, wherein performing the second iterative reconstruction comprises iteratively reconstruction from the data representing the emissions over at least 40 seconds, and wherein calculating comprises calculating the complementary reconstruction representing the emissions of the difference between the at least 50 seconds and the at least 40 seconds.

13. The non-transitory computer readable storage medium of claim 10 wherein calculating the complementary reconstruction comprises converting a Poisson noise distribution of the first and second iterative reconstructions into a substantially Gaussian noise distribution of the complementary reconstruction.

14. The non-transitory computer readable storage medium of claim 10 wherein calculating the complementary reconstruction comprises calculating an input function.

15. The non-transitory computer readable storage medium of claim 10 wherein calculating the complementary reconstruction comprises calculating a spatial distribution.

16. In a non-transitory computer readable storage medium having stored therein data representing instructions executable by a programmed processor for reconstructing an image in emission tomography, the storage medium comprising instructions for:

subtracting first detected events from a sub-period from second detected events of a period, the sub-period being within the period, the subtracting resulting in a set of third detected events comprising the second detected events without the first detected events; and generating first data representing the sub-period from the set of the third detected events, the set of the third detected events representing the period without the sub-period.

17. The non-transitory computer readable storage medium of claim 16 wherein generating the first data comprises:

iteratively reconstructing second data from the second detected events representing the period;

iteratively reconstructing third data from the third detected events; and subtracting the third data from the second data.

18. The non-transitory computer readable storage medium of claim 16 wherein generating the first data comprises generating an image of spatial distribution of the first detected events over the sub-period, the sub-period being less than three seconds and the period being more than 100 seconds.

19. The non-transitory computer readable storage medium of claim 16 wherein generating the first data comprises generate an input function over the sub-period, the sub-period being less than three seconds and the period being more than 100 seconds.

20. The non-transitory computer readable storage medium of claim 16 further comprising repeating the subtracting and generating for different sub-periods within the period.

* * * * *